W. EVANS.
SPRING-CONNECTION FOR VEHICLES.
No. 181,423. Patented Aug. 22, 1876.
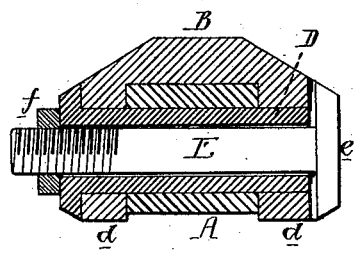
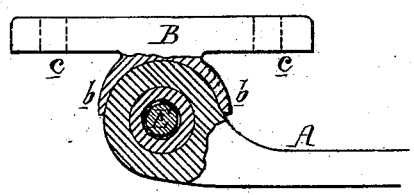
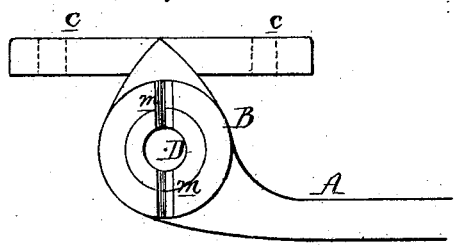
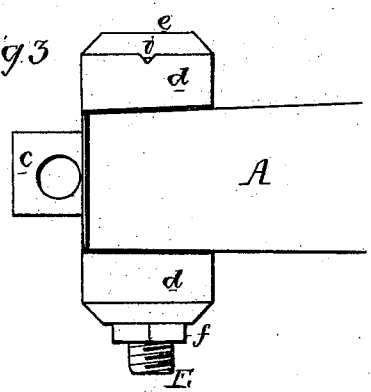
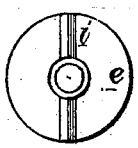
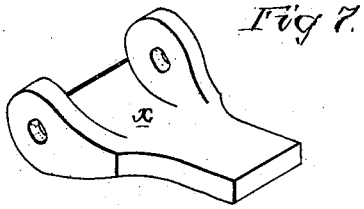
Witnesses
Harry Howson Jr
Harry Smith
William Evans,
by his Attorneys
Howson and Son

UNITED STATES PATENT OFFICE.

WILLIAM EVANS, OF PHILADELPHIA, PENNSYLVANIA, ASSIGNOR TO JOHN BENEZET, LEWIS T. MATLACK, WILLIAM EVANS, AND GEORGE E. EVANS, OF SAME PLACE.

IMPROVEMENT IN SPRING-CONNECTIONS FOR VEHICLES.

Specification forming part of Letters Patent No. 181,423, dated August 22, 1876; application filed June 22, 1876.

*To all whom it may concern:*

Be it known that I, WILLIAM EVANS, of Philadelphia, Pennsylvania, have invented an Improved Spring-Connection for Vehicles, of which the following is a specification:

The object of my invention is to construct a simple and durable device for connecting springs to vehicles, and this object I attain in the manner which I will now proceed to describe, reference being had to the accompanying drawing, in which—

Figure 1 is a longitudinal vertical section of my improved spring-connection; Fig. 2, a transverse section of the same; Fig. 3, an inverted plan view; Figs. 4 and 5, detached views, and Fig. 6 a modification.

My invention is intended to be used in connection with a spring, having at each end an eye, $a$, formed either in the enlarged solid end of the spring, as in Fig. 2, or by bending the metal, as shown in Fig. 6, and is intended to displace the well-known "French head" spring, (shown in Fig. 7,) which is objectionable, because the portion $x$ becomes filled with dirt, which interferes with the proper action of the spring.

In Figs. 1, 2, 3, 4, and 6, A represents part of a spring, the rounded end of which is adapted to a cap, $b$, formed on a block, B, having lugs $c\ c$, by which it is attached to a vehicle, and at each end ears $d\ d$, in which are formed bearings for the ends of a sleeve, D, the latter fitting snugly in the eye $a$ of the spring, and being preferably headed at one end, as shown in Fig. 1. Through this sleeve D passes a bolt, E, having at one end a head, $e$, and being threaded at the other end, where it is provided with a nut, $f$, by screwing which tight the various parts are firmly secured together.

In order to prevent the turning of the bolt R its head E is provided with V-shaped ribs $i$, which are adapted to recesses $m$ of similar shape, formed in one end of the sleeve D, and in one edge of the block B, as shown in Figs. 4 and 5.

It will be seen that the strain of the spring is brought directly upon the sleeve D, and is entirely removed from the bolt E, which merely serves to secure the various parts together.

The rounded end of the spring can turn in the cap $b$, the downwardly-projecting edges of which, however, effectually protect the end of the spring, and prevent the access of dust or dirt to the joint, while, owing to the fact that the end of the spring fits snugly between the inside of the cap $b$ and the sleeve D, all disagreeable rattling of the spring is prevented.

My invention may be applied, if desired, to the ends of elliptic springs composed of a number of plates, as well as to springs of the character shown and described.

I claim as my invention—

1. The combination of the spring A, having a rounded end, with the block B constructed for attachment to a vehicle, and having a cap, $b$, adapted to the rounded end of the spring, and ears $d$, serving as bearings for the pivoting bolt or sleeve, as set forth.

2. The combination of the bolt E and its head $c$, having ribs $i$, with the block B and sleeve D, having notches $m$, as described.

In testimony whereof I have signed my name to this specification in the presence of two subscribing witnesses.

WILLIAM EVANS.

Witnesses:
HARRY HOWSON, Jr.,
HARRY SMITH.